(12) United States Patent
Pruett

(10) Patent No.: US 9,134,098 B1
(45) Date of Patent: Sep. 15, 2015

(54) COUNTERMEASURE SYSTEM AND METHOD FOR DEFEATING INCOMING PROJECTILES

(71) Applicant: Raytheon Company, Waltham, MA (US)

(72) Inventor: James A Pruett, Allen, TX (US)

(73) Assignee: Raytheon Company, Waltham, MA (US)

( * ) Notice: Subject to any disclaimer, the term of this patent is extended or adjusted under 35 U.S.C. 154(b) by 131 days.

(21) Appl. No.: 13/666,350

(22) Filed: Nov. 1, 2012

(51) Int. Cl.
*F41A 9/00* (2006.01)
*F41H 13/00* (2006.01)

(52) U.S. Cl.
CPC ........................... *F41H 13/00* (2013.01)

(58) Field of Classification Search
CPC ............ F41F 3/04; F41F 3/042; F41F 3/052; F41F 3/06; F41F 3/065
USPC .................... 89/1.801, 1.817, 37.16
See application file for complete search history.

(56) References Cited

U.S. PATENT DOCUMENTS

| | | | | |
|---|---|---|---|---|
| 3,397,638 | A * | 8/1968 | Gould | 102/377 |
| 5,993,921 | A * | 11/1999 | Hunn | 428/34.4 |
| 7,506,498 | B2 | 3/2009 | Eidelman | |
| 7,849,695 | B1 | 12/2010 | Cover et al. | |
| 8,205,537 | B1 * | 6/2012 | Dupont | 89/1.34 |
| 8,387,507 | B2 * | 3/2013 | Johnson et al. | 89/1.1 |
| 2010/0282055 | A1 * | 11/2010 | Jansson | 89/1.817 |

* cited by examiner

*Primary Examiner* — J. Woodrow Eldred
(74) *Attorney, Agent, or Firm* — Renner, Otto, Boisselle & Sklar, LLP

(57) ABSTRACT

A countermeasure system for intercepting an incoming weapon, such as a rocket propelled grenade (RPG), includes a launcher that is used to launch a countermeasure. A door covers and protects the countermeasure in an opening in the launcher prior to the launch of the countermeasure. The door is separated (pushed away) from launcher when the countermeasure is launched, for example being pushed out into a flight path of the countermeasure by the countermeasure itself. The door may be attached to the countermeasure, or may be a separate piece that flies away from both the countermeasure and the launcher after launch of the countermeasure. Pitch over motors or other orientation adjustment devices may be used to change the orientation of the countermeasure after launch. The countermeasure may be used to defeat the incoming weapon in any of a variety ways.

17 Claims, 4 Drawing Sheets

COUNTERMEASURE SYSTEM AND METHOD FOR DEFEATING INCOMING PROJECTILES

BACKGROUND OF THE INVENTION

1. Field of the Invention

The invention is in the field of countermeasure systems and methods for defeating incoming projectiles.

2. Description of the Related Art

Rocket propelled grenades (RPGs) are examples of a type of projectile that poses a great threat to ground vehicles, aircraft, and helicopters. RPGs are commonly used during close-in military engagements, where the shooter and the target are close to one another. The flight time of an RPG to target is on the order of 100 milliseconds. Therefore a fast response is important in defeating an incoming RPG, as well as many other types of incoming weapons.

In addition, it is desirable that countermeasures for defeating incoming weapons be protected from bullets, shrapnel, and other threats, prior to use. Armor has been used to protect the countermeasures, and protective doors used to cover launch openings have been moved out of the way by use of pyrotechnic-, hydraulic-, and/or spring-actuated mechanisms. However, these mechanisms all take some time to operate, and/or require a large amount of potential energy to be stored up and then released in a short time. Storage of a large amount of potential energy may require a large volume and/or weight, and release of a large amount of energy in a short time may be hazardous if accidentally actuated prior to operation.

SUMMARY OF THE INVENTION

A countermeasure system includes a launcher that has one or more countermeasures released from openings in the launcher. The countermeasures are protected prior to launch by doors that are pushed out of contact with the launcher by the countermeasures, as the countermeasures are launched.

According to an aspect of the invention, a countermeasure system includes a door that separates from a launcher when the countermeasure is launched from the launcher.

According to another aspect of the invention, a countermeasure system for intercepting an incoming weapon includes: a launcher; a countermeasure that is launched from an opening the launcher; and a door that covers the countermeasure in the opening, prior to launch of the countermeasure. When the countermeasure is launched, the countermeasure pushes the door out of connection with a remainder of the launcher.

According to yet another aspect of the invention, a method of protecting from an incoming weapon includes: launching a countermeasure in a launcher; and defeating the incoming weapon using the countermeasure. The launching the countermeasure includes separating from the launcher a door that covers and protects the countermeasure prior to launch.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A countermeasure system for intercepting an incoming weapon, such as a rocket propelled grenade (RPG), includes a launcher that is used to launch a countermeasure. A door covers and protects the countermeasure in an opening in the launcher prior to the launch of the countermeasure. The door is separated (pushed away) from launcher when the countermeasure is launched, for example being pushed out into a flight path of the countermeasure by the countermeasure itself. The door may be attached to the countermeasure, or may be a separate piece that flies away from both the countermeasure and the launcher after launch of the countermeasure. The door may be attached to a back end of the countermeasure, with the countermeasure being launched backwards, with the back end of the countermeasure leaving the launcher first. Pitch over motors or other orientation adjustment devices may be used to change the orientation of the countermeasure after launch. The countermeasure may be used to defeat the incoming weapon in any of a variety ways, such as by colliding with the incoming weapon or detonating a warhead near the incoming weapon; deploying a device, such as a net, to capture the device; and/or by firing a single or multiple projectiles that impacts the incoming weapon. The door may be an armored door that protects the countermeasure from damage prior to launch, such as by protecting the countermeasure from impact of bullets that may be fired at the launcher (or a device that has the launcher mounted on or in it) prior to launch of the countermeasure. The countermeasure system advantageously provides for rapid removal of the door during the launch process. The rapid removal of the door allows for more rapid deployment of the countermeasure, which may be important in defeating a range of fast-moving incoming weapons.

Figure 1:
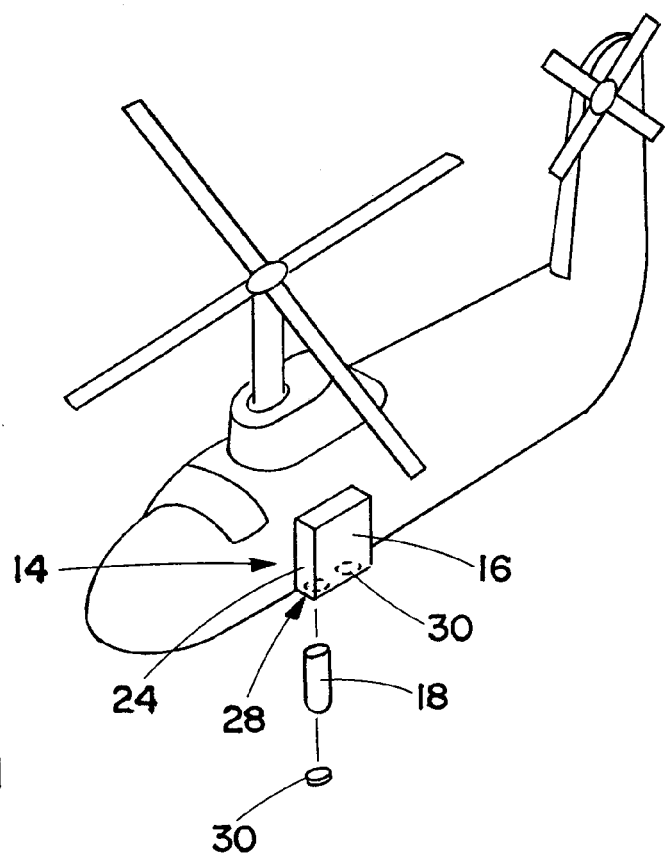
FIG. 1 is an oblique view, showing a countermeasure system of the present invention, mounted on a helicopter, being used in defeating an incoming weapon.

FIG. 1 shows a vehicle 10, a helicopter in the illustrated embodiment, that includes a countermeasure system 14 for protecting the vehicle 10 from an incoming weapon 15. The weapon may be a rocket-propelled grenade (RPG), to give one example. The incoming weapon 15 alternatively may be any of a variety of missiles or projectiles, configured to impact the vehicle 10 and/or to damage the vehicle, such as by use of explosives. The countermeasure system 14 includes a launcher 16 that is used to launch one or more countermeasures 18, to defeat the incoming weapon 15 in any of a variety of ways. As is described in greater detail below, the countermeasure 18 may defeat the incoming weapon 15 by colliding with it, by enveloping it with a net, or by shooting a single or multiple projectiles at it, to give just a few examples.

The vehicle 10 may be any of a variety of air vehicles, including the helicopter illustrated in FIG. 1, as well as airplanes, drones, and other air vehicles. Alternatively the vehicle may be a ground vehicle, such as a tank, truck, or armored personnel carrier, or a sea vehicle, such as a ship.

The launcher 16 has an armored external surface 24 that is configured to withstand bullets and other impacts, while protecting integrity of the countermeasures 18 within the launcher 16. The external surface 24 may made of any of a variety of materials, including rolled homogeneous armor (rha), titanium, a ceramic composite combination, or composite (nonmetallic) material. The type of material and other characteristics, such as thickness, shape, or angle, of the external surface 24 may be chosen to provide the desired protection from bullets, shrapnel, and other potential causes of damage to the countermeasures 18 and to the operative parts of the launcher 16.

The countermeasures 18, when launched, emerge from openings 28 in the launcher 16. Before launching, the openings are covered by armored doors 30, which protect the enclosed countermeasures 18 from bullets, shrapnel, and other impacts that may damage the countermeasures 18 prior to launch. The doors 30 may be made of or may be coated with the same material as the launcher external surface 24. The doors 30 may be made of a lighter (less dense) material than the external surface 24, since lower weight for the doors 30 is advantageous. A lower weight for the doors 30 allows the doors 30 to be moved with less energy and less of an impulse, speeding the launching process.

The doors 30 are separated from the launcher 16 during the launch of the countermeasures 18. In the illustrated embodiment the doors 30 are separate pieces that are pushed out of the way as part of the launch of the countermeasure 18. The door 30 is pushed out into the initial flight path 32 of the countermeasure 18. This allows for faster deployment of the countermeasure 18 than if the door 30 was on a spring-driven hinging mechanism, for example.

Prior to separation the doors 30 may be lightly attached to the launcher 16. For example, the doors 30 may be press fit into ends of the openings 28, or perhaps held in place by a suitable adhesive. This allows the doors 30 to easily separate from the launcher 16 when the countermeasures 18 are launched.

In the launch of the countermeasure 18 the countermeasure 18 is propelled from the launcher 16 using any of a variety of suitable methods. For example, a gas generator (not shown) within the launcher 16 may be used to generate pressurized gas that drives the countermeasure 18 out of the opening 28. The gas generator may be a suitable solid propellant material, for example similar to gas generation materials used to inflate airbags. Alternatively the countermeasure 18 may be expelled from the launcher 16 by other mechanisms, for example by use of a mechanical mechanism to catapult the countermeasure 18 from the launcher 16.

The force that expels the countermeasure 18 also separates the door 30 from the launcher 16. Advantageously the door 30 is separated rapidly and using little force. Thus launch of the countermeasure 18 is not delayed by using a separate mechanism to move the door 30 out of the way. Nor is an appreciable amount of energy used in separating the door 30, since the door 30 is light, and the countermeasure 18 is expelled with great force.

In addition, the separation of the door 30 does not add any appreciable hazard to the system, as would be the case if a dedicated pyrotechnic charge were used to remove the door 30. The hazards in storing, transporting, and handling the countermeasure system 14 are all involved in the mechanism to propel the countermeasure 18 from the launcher 16, so that the door separation by the countermeasure does not introduce any new safety issue.

The door 30 may have the same shape as the cross-sectional shape of the countermeasure 18. For example, as in the illustrated embodiment, the door may have a circular (disk) shape, corresponding to a circular cross-section shape of the countermeasure 18.

Figure 2:
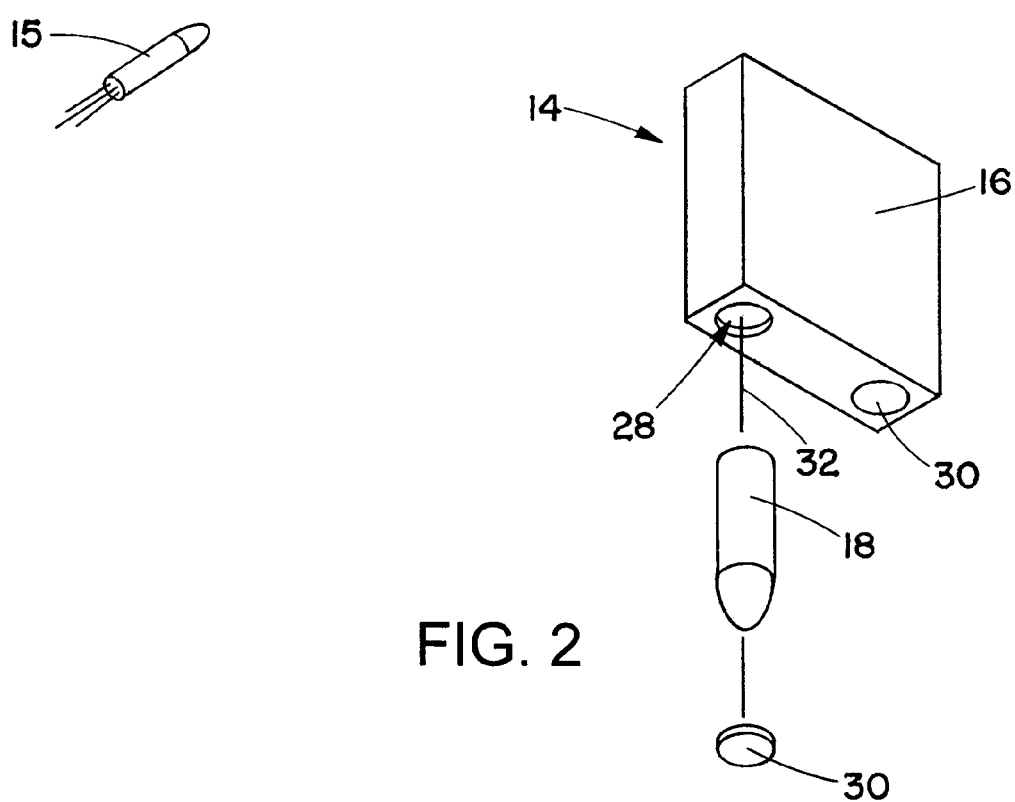
FIG. 2 is a view of the countermeasure system of FIG. 1 in a first step of a method of defeating the incoming weapon.

FIGS. 2-5 show the process of launching the countermeasure 18. In FIG. 2 the countermeasure 18 is shown emerging from the launcher 16 after the activation of the gas generator. The door 30 is separated from the launcher 16, into the initial flight path 32 of the countermeasure 18.

Figure 3:
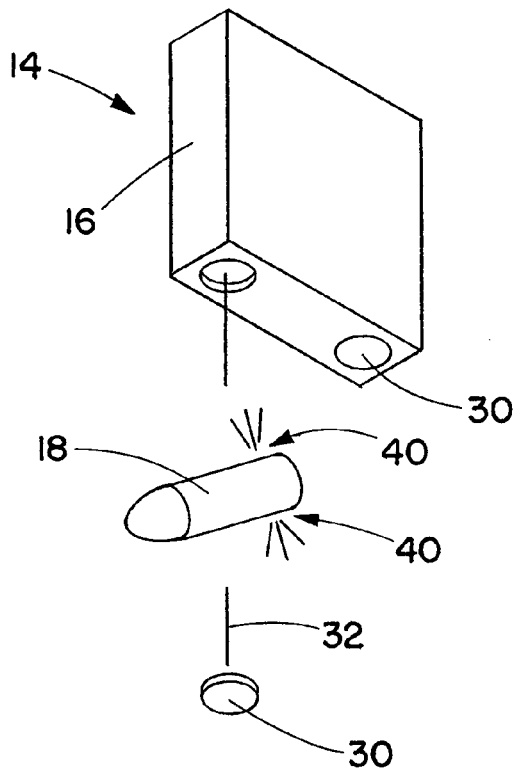
FIG. 3 is a view of the countermeasure system of FIG. 1 in a second step of the method of defeating the incoming weapon.
Figure 3:
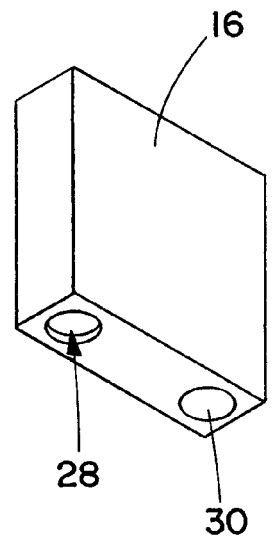

FIG. 3 shows the door 30 falling away from the flight path 32, with the countermeasure 18 continuing on its flight. The countermeasure 18 may reorient itself after launch, such as by firing thrusters such as pitch over motors 40 to change orientation of the countermeasure 18. The pitch over motors 40 may include solid rocket fuel and nozzles, allowing quick application of a predetermined amount of thrust. Timing the firing of pitch over motors 40 on opposite sides of the countermeasure 18 may be controlled to reorient the countermeasure 18 without imparting any substantial residual velocity on the countermeasure 18. Further details regarding the use of pitch over motors may be found in co-owned U.S. Pat. No. 8,173,946, the description and drawings of which are incorporated herein.

Figure 4:
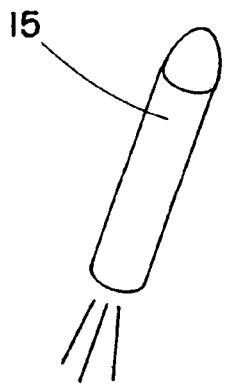
FIG. 4 is a view of the countermeasure system of FIG. 1 in a third step of the method of defeating the incoming weapon.

The reorientation may be to direct the countermeasure 18 toward the incoming weapon. FIG. 4 shows a main thruster 42 or other propulsion unit being used to propel the countermeasure 18 on a desired course after the reorientation, such as on a course toward the incoming weapon 15. The main thruster 42 may be a solid rocket fuel motor that creates pressurized gasses, and expels the pressurized gasses through a nozzle. Alternatively this step may be omitted, in situations where there is no need to propel the countermeasure 18 after reorientation.

Figure 5:
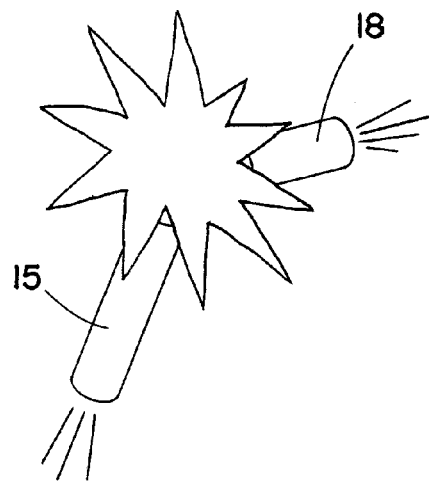
FIG. 5 is a view of the countermeasure system of FIG. 1 in a fourth step of the method of defeating the incoming weapon.

FIG. 5 shows the countermeasure 18 defeating the incoming weapon 15 by colliding with the incoming weapon 15. This knocks the incoming weapon 15 off course, preventing it from reaching the vehicle 10 (or another target of the incoming weapon 15).

Figure 6:
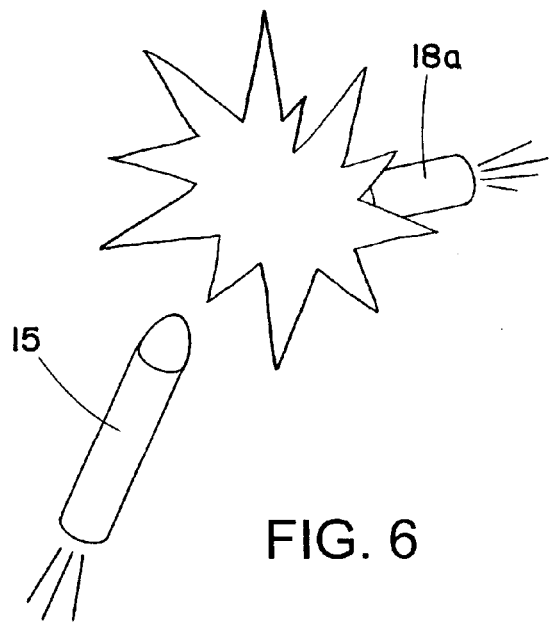
FIG. 6 illustrates an alternate engagement of the incoming weapon by the countermeasure, to defeat the incoming weapon.
Figure 7:
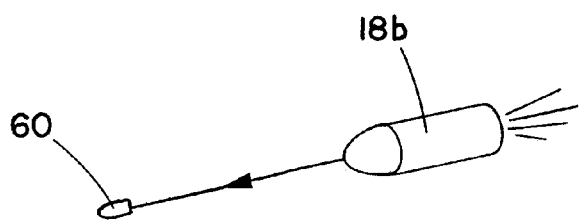
FIG. 7 illustrates another alternate engagement of the incoming weapon by the countermeasure, to defeat the incoming weapon.
Figure 7:
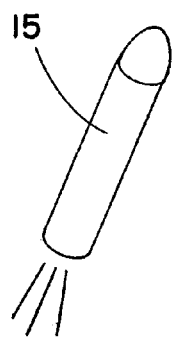
Figure 8:
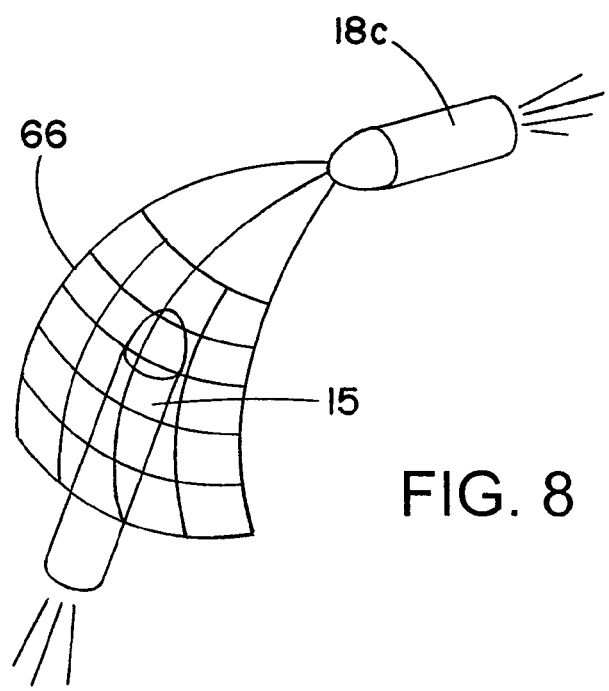
FIG. 8 illustrates yet another alternate engagement of the incoming weapon by the countermeasure, to defeat the incoming weapon.

FIGS. 6-8 illustrate other ways in which the countermeasure 18 may defeat the incoming weapon 15. FIG. 6 illustrates an alternate embodiment countermeasure 18a approaching the incoming weapon 15 and detonating an explosive, such as in a warhead of the countermeasure 15. The explosion may destroy both the incoming weapon 15 and the countermeasure 18a, or may otherwise damage and/or divert the incoming weapon 15 so that the incoming weapon 15 ceases to be a threat to its target.

FIG. 7 shows another embodiment, in which a countermeasure 18b fires a single or multiple projectiles 60 that impacts or otherwise affects the incoming weapon 15. The projectile 60 may divert the course of the incoming weapon 15 away from its target.

FIG. 8 shows still another embodiment, a countermeasure 18c that deploys a net 66 that surrounds and captures the incoming weapon 15. Further details regarding one such net system may be found in the co-owned U.S. Pat. No. 8 8,205,537, the drawings and detailed description of which are incorporated by reference in their entireties. The net 66 may mechanically join the countermeasure 18c and the incoming weapon 15 together, changing the courses of both. Alternatively the net 66 may separate from the countermeasure 18c, and the momentum imparted by the net 66 capturing the incoming weapon 15 may divert the incoming weapon 15. The net 66 is one example of many ways that a countermeasure may become coupled to the incoming weapon 15, causing both to move together on a new and different course.

Figure 9:
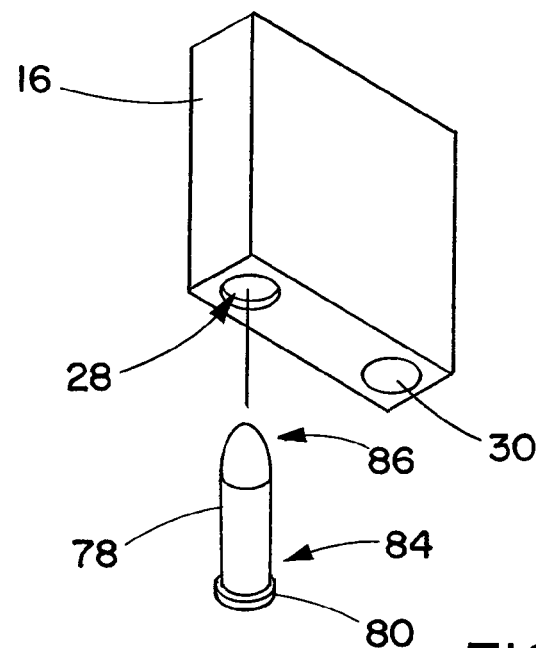
FIG. 9 is an oblique view of an alternate embodiment countermeasure system according to the invention.

FIG. 9 shows an alternative embodiment countermeasure system 74 in which a countermeasure 78 has a door 80 attached to it. The door 80 may be attached to a back end 84 of the countermeasure 78, such as by soldering, bolting, adhering, or welding. When the countermeasure 78 is launched, the door 80 moves with it, and separates from the launcher 16. The countermeasure 78 may be launched with the back end 84 emerging from the opening 28 first. After clearing the opening 28, the countermeasure 78 may then take actions such as described above with regard to the various embodiments of the countermeasure 18. The countermeasure 78 may be reoriented, may be propelled toward the incoming weapon 15 (FIG. 1), and may take any of various actions to defeat the incoming weapon 15, such as by diverting the incoming weapon 15. The action to defeat the incoming weapon 15 may involve use of a front end 86 of the countermeasure 78, the end of the countermeasure 78 that is on an opposite side of the countermeasure 78 from the back end 84.

The countermeasure system, in its various embodiments, offers advantages over prior systems. The doors protect the countermeasures from bullets, shrapnel, and other threats, prior to launch. Yet the doors do not require any appreciable time to be removed (separated from the launcher), since no mechanical mechanism (or other separate device) is used for moving the doors. Therefore the doors do not delay deployment of the countermeasures to any appreciable degree. Further, the separation of the doors by the countermeasures themselves does not require any appreciable expenditure of energy by the launching countermeasure.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A countermeasure system for intercepting an incoming weapon, the system comprising:
   a launcher;
   a countermeasure that is launched from an opening the launcher; and
   a door that covers the countermeasure in the opening, prior to launch of the countermeasure;
   wherein, when the countermeasure is launched, the countermeasure pushes the door out of connection with a remainder of the launcher; and
   wherein the door is attached to the countermeasure.

2. The countermeasure system of claim 1, wherein the door is attached to a back end of the countermeasure.

3. The countermeasure system of claim 1, wherein the door is pushed out and separated from the remainder of the launcher along an initial flight path of the countermeasure when the countermeasure is launched.

4. The countermeasure system of claim 1, wherein the door is an armored door.

5. The countermeasure system of claim 1, wherein the countermeasure includes pitch over motors to reorient itself after clearing an opening in the launcher from which the countermeasure is launched.

6. The countermeasure system of claim 1, wherein the countermeasure intercepts the incoming weapon.

7. The countermeasure system of claim 1, wherein the countermeasure fires a projectile at the incoming weapon.

8. The countermeasure system of claim 1, wherein the countermeasure includes a net used to capture the incoming weapon.

9. The countermeasure system of claim 1, wherein the countermeasure system is attached to a vehicle, with the countermeasure system used to protect the vehicle from the incoming weapon.

10. The combination of claim 9, wherein the vehicle is a helicopter.

11. A method of protecting from an incoming weapon, the method comprising:
    launching a countermeasure in a launcher; and
    defeating the incoming weapon using the countermeasure;
    wherein the launching the countermeasure includes separating from the launcher a door that covers and protects the countermeasure prior to launch, while maintaining the door intact; and
    wherein the door is attached to a back end of the countermeasure during the launching.

12. The method of claim 11, wherein the separating includes separating the door along an initial flight path of the countermeasure.

13. The method of claim 11, wherein the launching includes a back end of the countermeasure emerging from the launcher before a front end of the countermeasure.

14. The method of claim 11, further comprising, after the launching, reorienting the countermeasure using pitch over motors.

15. The method of claim 11, wherein the defeating includes the countermeasure colliding with the incoming projectile.

16. The method of claim 11, wherein the defeating includes the countermeasure firing a projectile at the incoming weapon.

17. The method of claim 11, wherein the defeating an incoming weapon includes defeating a rocket propelled grenade.

\* \* \* \* \*